(12) United States Patent
Cankaya et al.

(10) Patent No.: US 7,254,113 B2
(45) Date of Patent: Aug. 7, 2007

(54) PARTIALLY PREEMPTIVE BURST SCHEDULING MODEL FOR AN OPTICAL BURST SWITCHING NETWORK

(75) Inventors: Hakki Candan Cankaya, Dallas, TX (US); Tarek S. El-Bawab, Richardson, TX (US); Saravut Charcranoon, Richardson, TX (US)

(73) Assignee: Alcatel Lucent, Paris (FR)

( * ) Notice: Subject to any disclaimer, the term of this patent is extended or adjusted under 35 U.S.C. 154(b) by 1059 days.

(21) Appl. No.: 10/282,977

(22) Filed: Oct. 29, 2002

(65) Prior Publication Data

US 2004/0052213 A1    Mar. 18, 2004

Related U.S. Application Data

(60) Provisional application No. 60/411,708, filed on Sep. 18, 2002.

(51) Int. Cl.
*H04J 3/14* (2006.01)
*H04L 1/00* (2006.01)
(52) U.S. Cl. ...................... 370/235; 370/231
(58) Field of Classification Search ............... None
See application file for complete search history.

(56) References Cited

U.S. PATENT DOCUMENTS

2002/0097691 A1* 7/2002 Willenegger et al. ....... 370/318
2003/0206521 A1* 11/2003 Qiao ........................... 370/230

FOREIGN PATENT DOCUMENTS

WO    WO 99/40754    8/1999
WO    WO 00/38375    6/2000

OTHER PUBLICATIONS

Feihong Chen, Necdet Uzun, Ali N. Akansu; A Scalable Multicast ATM Switch Using Link Sharing and Prioritized Link Reservation: Computer Communications and Networks, 1999; Proceedings: Oct. 11-13, 1999, pp. 218-222.
Pankaj Gupta and Nick McKeown; Designing and Implementing a Fast Crossbar Scheduler; IEEE Micro, IEEE, Inc., vol. 19, No. 1, Jan. 1999, pp. 20-28.
Rainer Schoenen and Roman Hying; Distributed Cell Scheduling Algorithms for Virtual-Output-Queued Switches; 1999 IEEE Global Telecommunications Conference; Globecom '99; Seamless Interconnection for Universal Services; vol. 2, Dec. 5-9, 1999, pp. 1211-1215.

* cited by examiner

*Primary Examiner*—Chi Pham
*Assistant Examiner*—Ronald Abelson
(74) *Attorney, Agent, or Firm*—Danamraj & Youst, P.C.; Jessica W. Smith

(57) ABSTRACT

A partially preemptive quality of service ("QoS") scheduling model for application in an optical burst switched ("OBS") network node is described. In one aspect, the invention comprises a method for dropping only a portion of a data burst under consideration that overlaps with a portion of an already-scheduled data burst. In another aspect, the invention comprises preempting only that portion of an already-scheduled data burst that overlaps with a portion of a data burst under consideration and scheduling the data burst under consideration in its entirety. In one embodiment, the decision whether to drop a portion of the data burst under consideration or preempt a portion of the already-scheduled data burst is based on the relative priorities of the bursts. Similarly, the decision whether to perform a partial or full drop or preempt is based on the amount of overlap between the bursts.

19 Claims, 12 Drawing Sheets

Head-Overlap_Drop

Tail-Overlap_Preempt

Head-Tail_Drop

Full_Preempt

Full_Drop

PARTIALLY PREEMPTIVE BURST SCHEDULING MODEL FOR AN OPTICAL BURST SWITCHING NETWORK

PRIORITY UNDER 35 U.S.C. §119(e) & 37 C.F.R. §1.78

This nonprovisional application claims priority based upon the following prior United States provisional patent application: U.S. Provisional Patent Application Ser. No. 60/411,708, filed Sep. 18, 2002, entitled Partially Preemptive Burst Scheduling for Multi-Service Optical Burst-Switched Networks, which is hereby incorporated by reference for all purposes.

BACKGROUND OF THE INVENTION

1. Technical Field of the Invention

The present invention generally relates to optical burst switching ("OBS") networks. More particularly, and not by way of any limitation, the present invention is directed to a method of implementing partially preemptive burst scheduling in an OBS network.

2. Description of Related Art

In OBS technology, data bursts, each of which is made up of multiple packets, are switched optically at core nodes in the OBS network. A small control packet, called the Burst Header Packet ("BHP") travels an offset time ahead of the data burst along the same data burst route and configures the optical switch for the duration of the data bursts at the core node. Basically, the BHP travels an offset time ahead of the data burst and establishes a path for the burst.

Because a BHP arrives at core nodes prior to its corresponding data burst trying to configure the switch for transparent fly-through, a short-term scheduling calendar, referred to as a "Sliding Frontier" or "SF", must be maintained for prospective data burst arrivals. The SF includes all of the data channels and control channels for core node adjacency in the core OBS network. The SF progresses with the current time on the near-end and the latest scheduled burst on the far-end. All scheduled data bursts and their corresponding BHPs are maintained in the SF data structures such that each pair is doubly linked to each other.

FIG. 1 illustrates an SF 100 comprising k data channels D1-Dk and n control channels C1-Cn. As illustrated in FIG. 1, a first data burst 102a and its BHP 104a are scheduled on data channel Dk and control channel Cn, respectively. A second data burst 102b and its BHP 104b are scheduled on data channel D1 and control channel C1, respectively. A third data burst 102c and its BHP 104c are scheduled on data channel D2 and control channel C1, respectively.

Contention may occur between multiple data bursts attempting to traverse the same egress link. In current OBS technology, data bursts are scheduled intact.

Accordingly, when a burst overlaps another already-scheduled burst, it is dropped in its entirety, even if the overlap is minimal. This results in a drop in utilization. As will be defined herein, five different overlap situations may occur. FIG. 2A illustrates a case in which there is "No Overlap" between an already-scheduled burst 200 and a burst under consideration 202. In this case, there is no contention between the two burst 200, 202, and both can be scheduled without conflict. FIG. 2B illustrates a case of "Head Overlap", in which case a front portion or "head" 212 of a burst under consideration 214 overlaps with a rear portion 216 of an already-scheduled burst 218. FIG. 2C illustrates a case of "Tail Overlap", in which case a rear portion or "tail" 222 of a burst under consideration 224 overlaps with a front portion 226 of an already-scheduled burst 228. FIG. 2D illustrates a case of "Head-Tail Overlap", in which case a head 232a and tail 232b of a burst under consideration 234 respectively overlap with a rear portion 236a of a first already-scheduled burst 238a and with a front portion 236b of an second already-scheduled burst 238b. FIG. 2E illustrates "Full Overlap", in which case the entirety of a burst under consideration 244 overlaps with a portion 246 of an already-scheduled burst 248.

In normal practice of OBS technology, if any of the above-described types of overlap occur, the entire burst under consideration is dropped, even if only a small fraction thereof overlaps with an already-scheduled burst. This causes a fragmentation effect that results in an inefficient use of bandwidth because it leaves raw bandwidth unutilized. It also increases packet loss.

Possible solutions to inefficient bandwidth utilization, fragmentation, and high packet loss caused by the above-described practice include optical buffering and wavelength dimensioning. For quality of service ("QoS") support in OBS, there is an approach that uses offset value adjustments. Unfortunately, optical buffering is not a matured technology and can be performed only in a limited way by Fiber Delay Lines ("FDLs"), which have a big footprint in equipment design and are a source of optical impairments. FDLs do not offer random access feature and can be designed only in segments. Further, optical buffering itself causes additional fragmentation. Wavelength dimensioning also has a physical limit in terms of number of wavelengths band requires full-scale wavelength conversion, which is not an easy practice. Offset value adjustments affects negatively the end-to-end delay and is not flexible enough; for example, it is not capable of accommodating multiple classes.

SUMMARY OF THE INVENTION

Accordingly, the present invention advantageously provides method and apparatus for implementing a partially preemptive QoS scheduling model in an OBS network node.

In one aspect, the invention comprises a method of scheduling data bursts for transmission on one of a plurality of outgoing channels in a router in an optical burst switched ("OBS") node. The method comprises the steps of, responsive to a determination that a data burst to be scheduled overlaps with an already-scheduled data burst on each of the plurality of outgoing channels, determining an optimum channel with respect to which the already-scheduled data burst thereon overlaps the least amount with the data burst to be scheduled; dropping a portion of the data burst to be scheduled that overlaps with the already-scheduled data burst on the optimum channel; and scheduling a remaining portion of the data burst to be scheduled on the optimum channel.

In another aspect, the invention comprises a method of scheduling data bursts for transmission on one of a plurality of outgoing channels in a router in an optical burst switched ("OBS") node. The method comprises the steps of, responsive to a determination that a data burst to be scheduled overlaps with an already-scheduled data burst on each of the plurality of outgoing channels, determining an optimum channel with respect to which the already-scheduled data burst thereon overlaps the least amount with the data burst to be scheduled; dropping a portion of the already-scheduled data burst on the optimum channel that overlaps with the data burst to be scheduled; and scheduling the data burst to be scheduled on the optimum channel.

In another aspect, the invention comprises a method of scheduling data bursts for transmission on one of a plurality of outgoing channels in a router in an optical burst switched ("OBS") node. The method comprises the steps of, responsive to a determination that a data burst to be scheduled overlaps with an already-scheduled data burst on each of the plurality of outgoing channels, determining an optimum one of the outgoing channels with respect to which the already-scheduled data burst thereon overlaps the least amount with the data burst to be scheduled. Responsive to a priority of the already-scheduled data burst on the optimum channel being higher than that of the data burst to be scheduled, a portion of the data burst to be scheduled that overlaps with the already-scheduled data burst on the optimum channel is dropped and a remaining portion of the data burst to be scheduled on the optimum channel is scheduled. Responsive to a priority of the data burst to be scheduled being higher than that of the already-scheduled data burst on the optimum channel a portion of the already-scheduled data burst on the optimum channel that overlaps with the data burst to be scheduled is preempted and the data burst to be scheduled is scheduled in its entirety.

In anther aspect, the invention comprises an apparatus for scheduling data bursts for transmission on one of a plurality of outgoing channels in a router in an optical burst switched ("OBS") node. The apparatus comprises means responsive to a determination that a data burst to be scheduled overlaps with an already-scheduled data burst on each of the plurality of outgoing channels for determining an optimum channel with respect to which the already-scheduled data burst thereon overlaps the least amount with the data burst to be scheduled; means for dropping a portion of the data burst to be scheduled that overlaps with the already-scheduled data burst on the optimum channel; and means for scheduling a remaining portion of the data burst to be scheduled on the optimum channel.

In another aspect, the invention comprises an apparatus for scheduling data bursts for transmission on one of a plurality of outgoing channels in a router in an optical burst switched ("OBS") node. The apparatus comprises means responsive to a determination that a data burst to be scheduled overlaps with an already-scheduled data burst on each of the plurality of outgoing channels for determining an optimum channel with respect to which the already-scheduled data burst thereon overlaps the least amount with the data burst to be scheduled; means for dropping a portion of the already-scheduled data burst on the optimum channel that overlaps with the data burst to be scheduled; and means for scheduling the data burst to be scheduled on the optimum channel.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
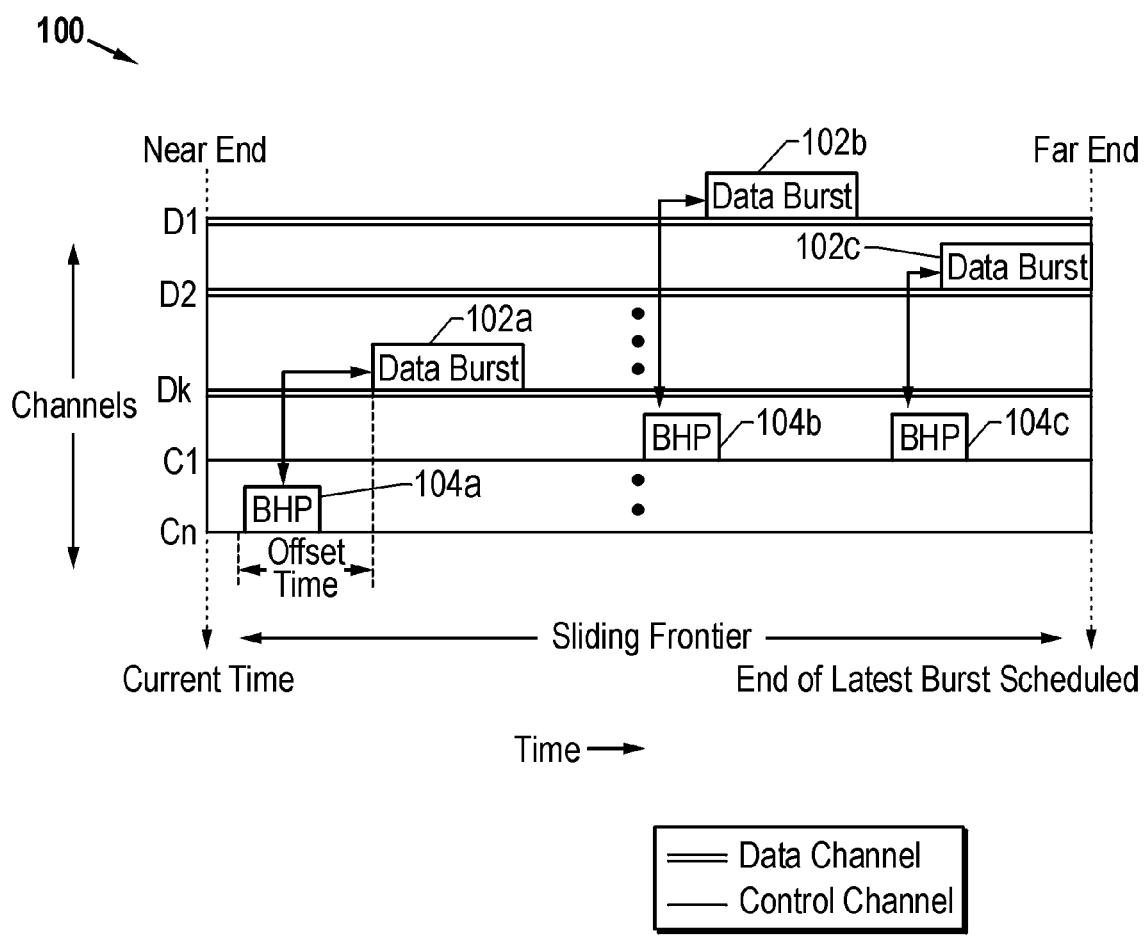
FIG. 1 illustrates an sliding frontier for use in scheduling data bursts in an OBS network.
Figure 2A:
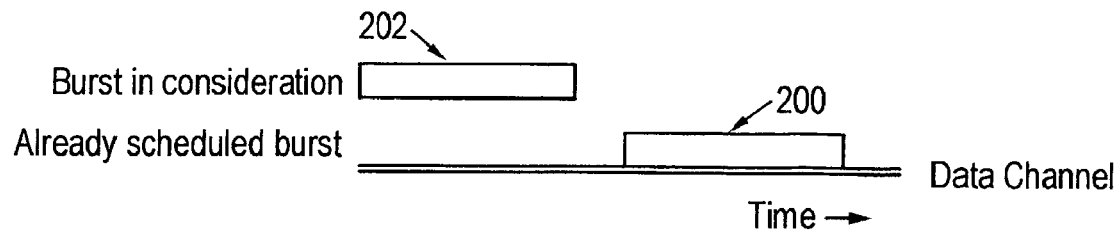
FIGS. 2A-2E each illustrate a different type of overlap that may occur in an OBS network between an already-scheduled burst and a data burst under consideration.
Figure 2B:
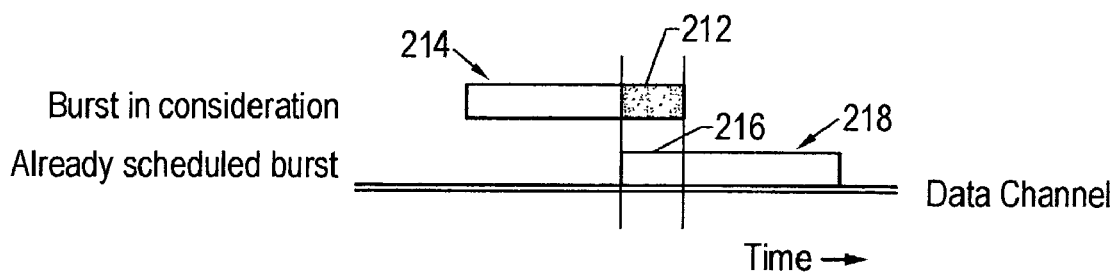
Figure 2C:
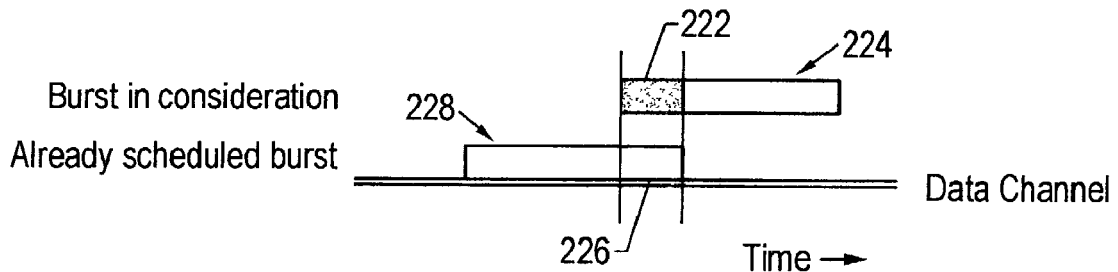
Figure 2D:
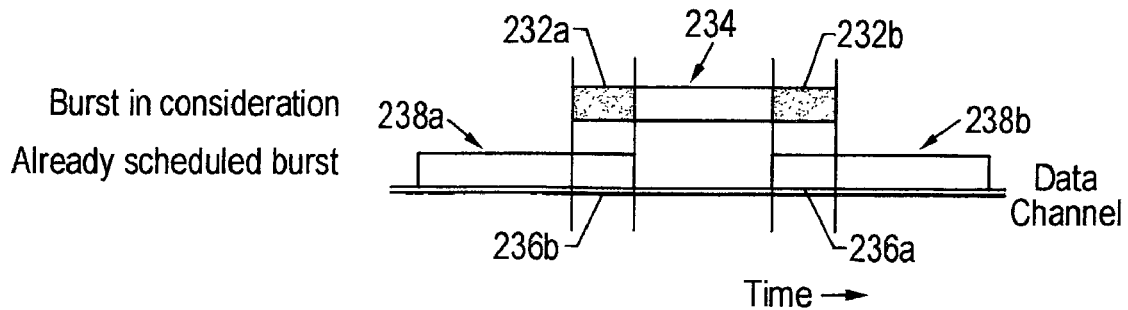
Figure 2E:
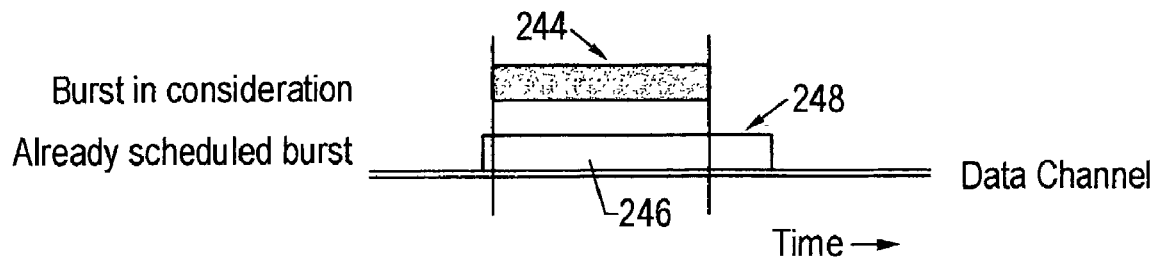

In the drawings, like or similar elements are designated with identical reference numerals throughout the several views thereof, and the various elements depicted are not necessarily drawn to scale.

Figure 3:
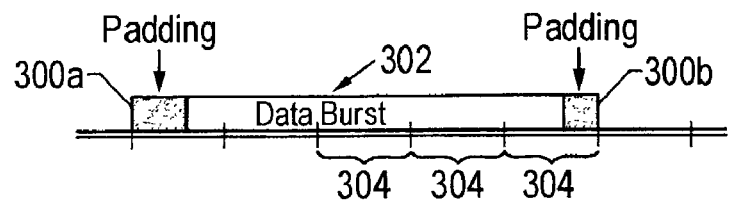
FIG. 3 illustrates the concept of slotted operation in an OBS network.

With current OBS technology, optical transmission and switching are performed in a slotted manner. The optical switch configuration is performed in parallel at each slot from all inputs to all outputs. This slotted operation of longer bursts gives the opportunity of partially preempting, or dropping, one burst for the benefit of another. Such preemption can be especially utilized for class-based QoS delivery at OBS. Bursts are made integer multiple of slots by using padding, as illustrated in FIG. 3. In particular, as shown in FIG. 3, padding 300a, 300b, has been added to each end of a data burst 302 so that the data burst 302 (including the padding 300a, 300b) comprises an integer multiple of slots 304, in this case, five.

Slotted operation such as that illustrated in FIG. 3 supports a greater number of options in cases of overlap than just preempting, or dropping, the entire overlapping burst. One option that will be described in greater detail below and that is referred to herein as partial dropping involves dropping only the overlapping portion of the burst under consideration. It will be recognized that partial dropping requires some modification of the BHP, as described hereinbelow. Another option that will be described in greater detail below and that is referred to herein as partial preemption involves preempting the overlapped portion of the already-scheduled data burst. This requires modifications and/or rescheduling of both the BHP of the partially preempted data burst and the BHP of the data burst under consideration.

After a data burst and its corresponding BHP are forwarded to an outgoing link, depending on the wavelength conversion capability of the switch, each data burst has a spectrum of wavelengths to which it can be converted. The spectrum of wavelengths to which a data burst can be converted depends on the incoming wavelength of the burst. This spectrum is represented by a set for each incoming wavelength $D_1$, $W_b(D_1)=\{D1, D3, \ldots\}$, where i=1, 2, ... k and k is the total number of wavelengths.

Figure 4:
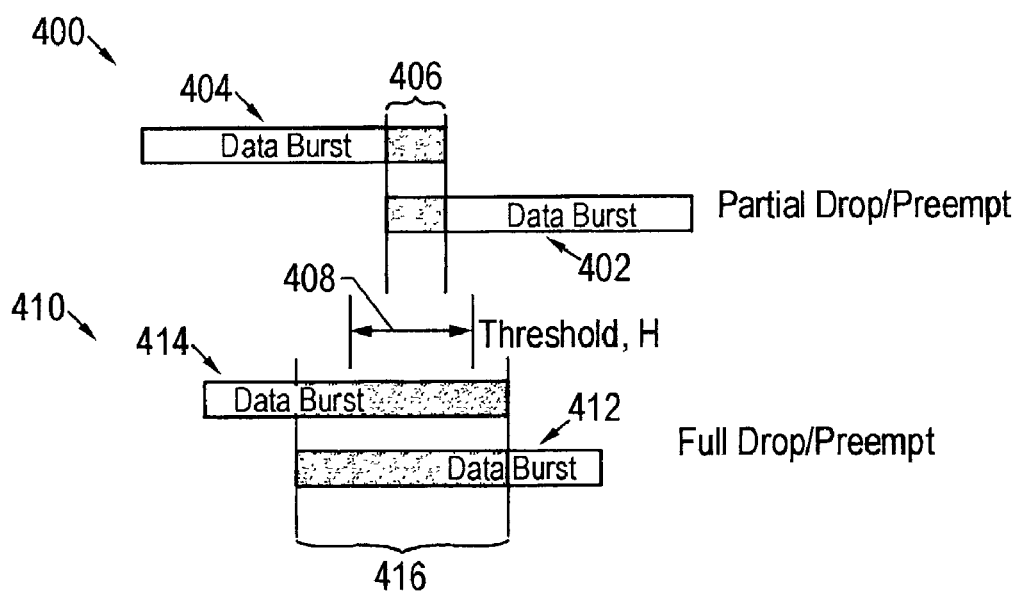
FIG. 4 illustrates the concept of a threshold value of the overlap between an already-scheduled data burst and a data burst under consideration.

The partial dropping/preemption performed in the above-described situations are performed according to a threshold value H of the overlap. It would be more expedient to drop the entire burst under consideration or to preempt the entire already-scheduled burst if the ratio of the overlap is greater than the threshold value H. This concept is illustrated in FIG. 4, which illustrates a first overlap situation 400 involving an already-scheduled data burst 402 and a data burst under consideration 404. As shown in FIG. 4, the length of an overlap 406 is smaller than that of the threshold H, designated in FIG. 4 by a reference numeral 408. In this situation 400, therefore, a partial drop or preemption would be appropriate.

In contrast, in a second overlap situation 410 involving an already-scheduled data burst 412 and a data burst under consideration 414, the length of an overlap 416 is greater than that of the threshold H 408. In this situation 410, therefore, a full drop or preemption would be more appropriate, since the length of the overlap portion 416 comprises such a large percentage of the length of each of the data bursts 412, 414.

Figure 5A:
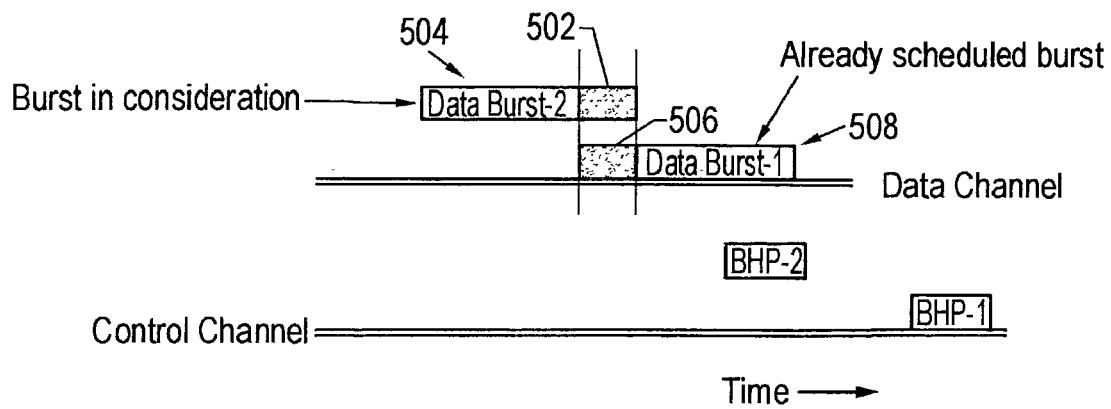
FIGS. 5A-5C illustrate the concept of partial preemption of a data burst in an OBS network.
Figure 5B:
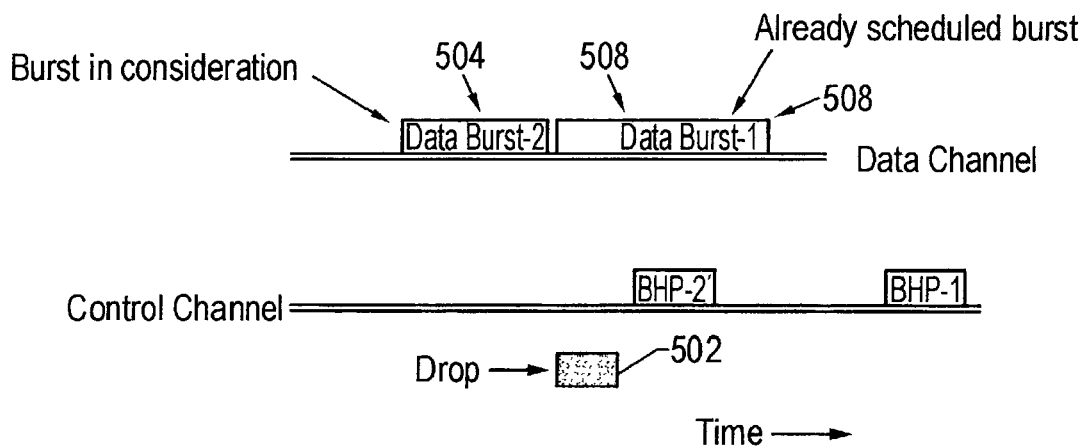

In accordance with one embodiment described herein, in cases of overlap, there are two possible courses of action. The first is to drop the portion of the data burst under consideration that overlaps with the already-scheduled data burst (or in cases such as the situation 410, to drop the data burst under consideration in its entirety). FIGS. 5A and 5B illustrate this first course of action.

As shown in FIG. 5A, a portion 502 of a data burst under consideration 504 overlaps with a portion 506 of an already-scheduled data burst 508. It will be assumed that the length of the overlapping portions 502, 506, is less than that of a predetermined threshold H. As illustrated in FIG. 5B, in a manner that will be described in greater detail below, a decision has been made to drop the portion 502 of the data burst under consideration 504 and to schedule the remainder of the data burst under consideration. The already-scheduled data burst 508 remains scheduled in its entirety.

Figure 5C:
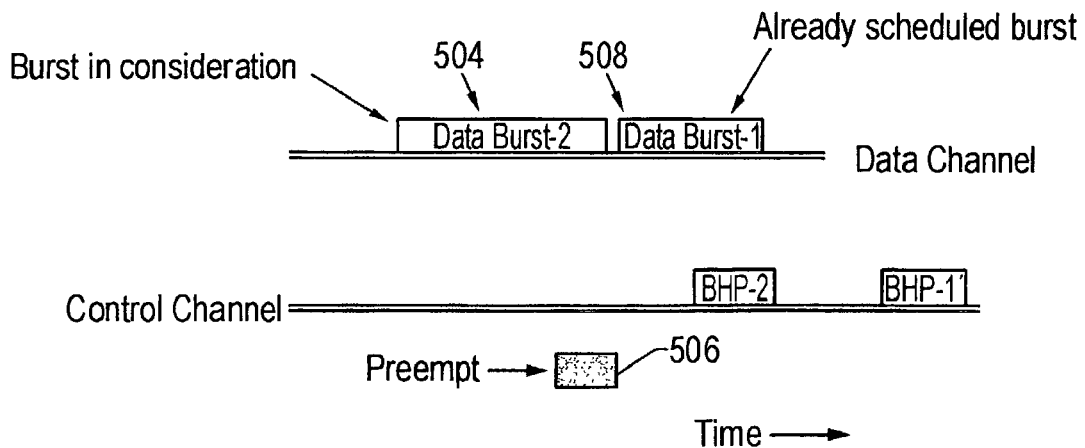

The second course of action is to preempt the portion of the already-scheduled data burst that overlaps with the data burst under consideration (or in cases such as the situation 410, to preempt the already-scheduled data burst in its entirety) and schedule the burst under consideration in its entirety. FIGS. 5A and 5C illustrate this course of action. As previously described, as illustrated in FIG. 5A, a portion 502 of a data burst under consideration 504 overlaps with a portion 506 of an already-scheduled data burst 508. It will be assumed that the length of the overlapping portions 502, 506, is less than that of a predetermined threshold H. As illustrated in FIG. 5C, in a manner that will be described in greater detail below, a decision has been made to preempt only the portion 506 of the already-scheduled data burst 508 (the remaining portion of the already-scheduled data burst remains scheduled) and to schedule the data burst under consideration 504 in its entirety.

The decision as to whether to partially or fully drop or preempt a burst is made according to priorities of classes to which bursts below by observing rules of fairness. For purposes of the partial dropping/preemption method that will be described in detail below, an overlap on each available outgoing channel i is defined as:

$L_1$ (overlap_type, overlap_amount, overlap_class)
where:
- overlap_type: y     y represents the code of the type of overlap
- overlap_amount: $(a_n, a_f)$     $a_n$ represents the amount of overlap in terms of slots at the near-end (head overlap); $a_f$ represents the amount of overlap in terms of slots at the far-end (tail overlap).
- overlap_class: $(c_n, c_f)$     $c_n$ represents the class of the near-end overlapping data burst; $c_f$ represents the far-end overlapping burst.

Accordingly, the parameters of an overlap are represented as:

$$L_1 (y, (a_n, a_f), (c_n, c_f))$$

Figure 6A:
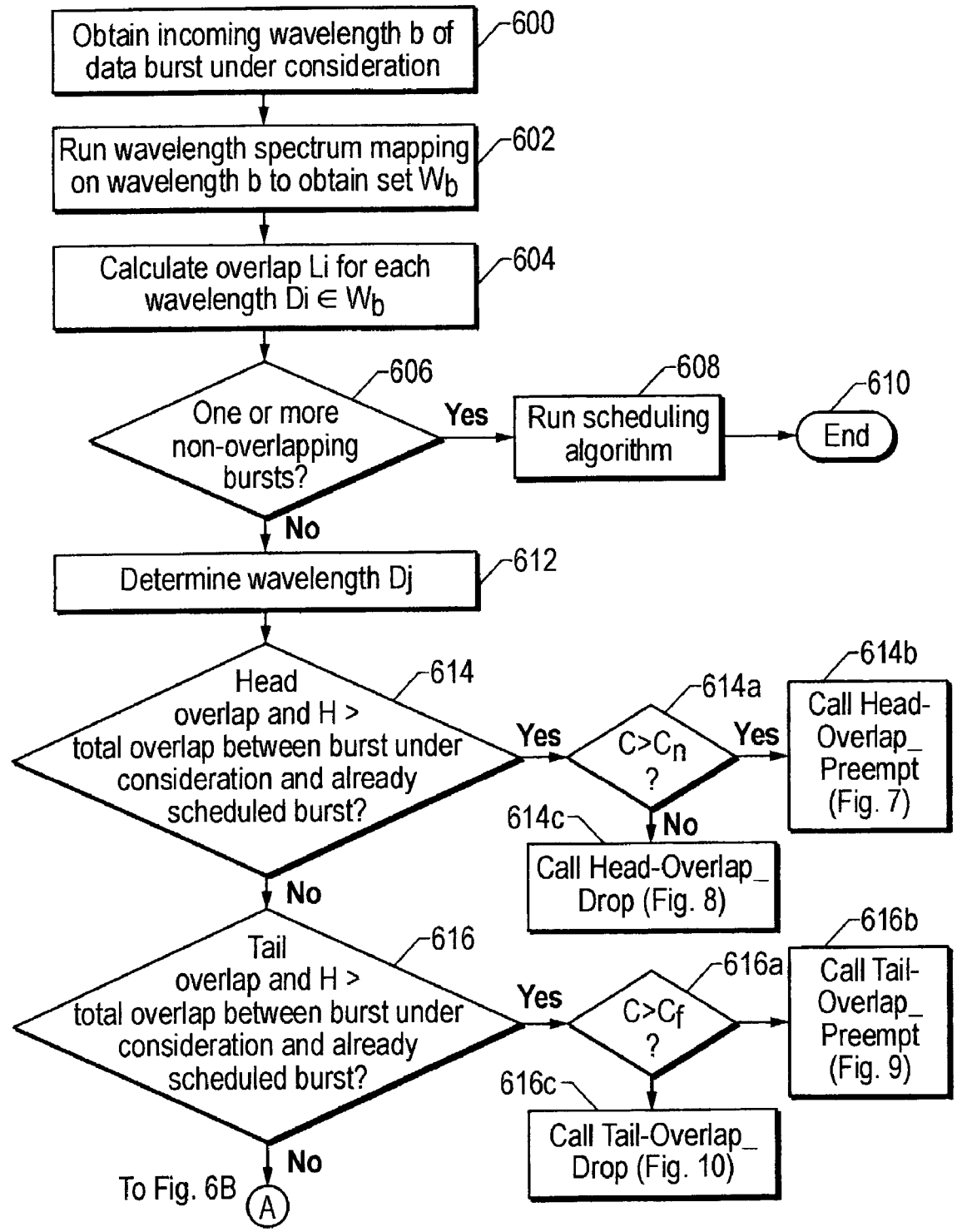
FIGS. 6A and 6B collectively illustrate a flowchart of the operation of one embodiment of a partially preemptive QoS scheduling model.
Figure 6B:
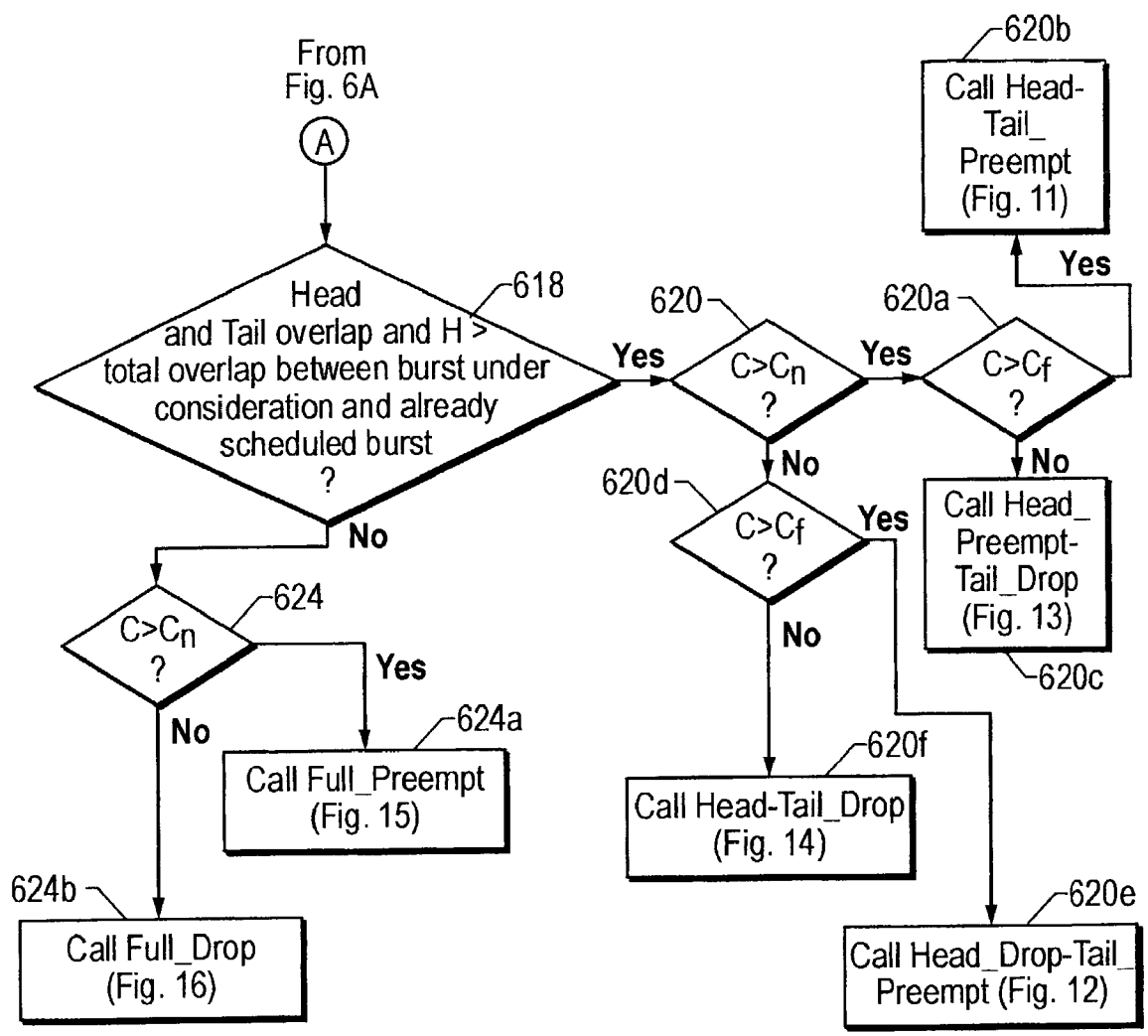

FIGS. 6A, 6B, and 7-16 collectively illustrate operation of one embodiment of a method of implementing partial preemption/dropping in an OBS network. Referring to FIGS. 6A and 6B, in step 600, the incoming wavelength b of the data burst under consideration is obtained from its BHP. In step 602, wavelength spectrum mapping is run on the wavelength b and the set $W_b$ is obtained. In step 604, the overlap $L_1$ for each outgoing wavelength $D_i$ that is a member of $W_b$ is calculated. In step 606, a determination is made whether there are one or more non-overlapping data bursts, in which case, the burst under consideration can be scheduled without contention from an already-scheduled data burst. If so, execution proceeds to step 608, in which a scheduling algorithm is run, and then to step 610, in which operation terminates.

If a negative determination is made in step 606, execution proceeds to step 612, in which the outgoing wavelength $D_j$ that has the smallest total overlap for all of the outgoing wavelengths $D_i$ that are members of the set $W_b$ is determined. In step 614, a determination is made whether the overlap type is a head overlap and the threshold H is greater than the total overlap between the burst under consideration and the already-scheduled burst(s). If so, execution proceeds to step 614a, in which a determination is made whether the class of service C of the data burst under consideration is of a higher priority, or greater than, the class of service $c_n$ of the already-scheduled near-end data burst. If so, execution proceeds to step 614b, in which a function Head-Overlap_Preempt (FIG. 7) is called. As a result of step 614b, because as determined in step 614a, the already-scheduled data burst is of a lower priority class of service than the data burst under consideration, the overlapping portion of the already-scheduled data burst is preempted so that the entire data burst under consideration can be scheduled.

If a negative determination is made in step 614a, execution proceeds to step 614c, in which a function Head-Overlap_Drop (FIG. 8) is called. As a result of step 614c, because as determined in step 614a, the already-scheduled data burst is of a higher priority class of service than the data burst under consideration, the overlapping portion of the data burst under consideration is dropped and the remaining portion of the data burst under consideration is scheduled.

If a negative determination is made in step 614, execution proceeds to step 616, in which a determination is made whether the overlap type is a tail overlap and the threshold H is greater than the total overlap between the burst under consideration and the already-scheduled burst(s). If so, execution proceeds to step 616a, in which a determination is made whether the class of service C of the data burst under consideration is greater than the class of service $c_f$ of the already-scheduled far-end data burst. If so, execution proceeds to step 616b, in which a function Tail-Overlap_Preempt (FIG. 9) is called. As a result of step 616b, because as determined in step 616a, the already-scheduled data burst is of a lower priority class of service than the data burst under consideration, the overlapping portion of the already-scheduled data burst is preempted so that the entire data burst under consideration can be scheduled.

If a negative determination is made in step 616a, execution proceeds to step 616c, in which a function Tail-Overlap_Drop (FIG. 10) is called. As a result of step 616c, because as determined in step 616a, the already-scheduled data burst is of a higher priority class of service than the data burst under consideration, the overlapping portion of the data burst under consideration is dropped and the remainder thereof is scheduled.

If a negative determination is made in step 616, execution proceeds to step 618, in which a determination is made whether the overlap type is a head and tail overlap and the threshold H is greater than the total overlap between the burst under consideration and the already-scheduled burst(s). If so, execution proceeds to step 620, in which a determination is made whether the class of service C of the data burst under consideration is greater than the class of service $c_n$ of the already-scheduled near-end data burst. If so, execution proceeds to step 620a, in which a determination is made whether the class of service C of the data burst under consideration is greater than the class of service $c_f$ of the already-scheduled far-end data burst. If so, execution proceeds to step 620b, in which a function Head-Tail_Preempt (FIG. 11) is called.

As a result of step 620b, because as determined in step 620, the near-end already-scheduled data burst is of a lower priority class of service than the data burst under consideration and as determined in step 620a, the far-end already-scheduled data burst is of a lower priority class of service than the data burst under consideration, the overlapping portions of both the near-end and far-end already-scheduled data bursts are preempted so that the entire data burst under consideration can be scheduled.

If a negative determination is made in step 620a, execution proceeds to step 620c, in which a function Head_Preempt-Tail_Drop (FIG. 13) is called. As a result of step 620c, because as determined in step 620, the near-end already-scheduled data burst is of a lower priority class of service than the data burst under consideration, the overlapping portion of the near-end already-scheduled data burst is preempted in favor of scheduling the near-end overlapping portion of the data burst under consideration. In contrast, because as determined in step 620a, the far-end already-scheduled data burst is of a higher priority class of service than the data burst under consideration, the far-end overlapping portion of the data burst under consideration is dropped and the far-end already-scheduled data burst remains scheduled in its entirety.

If a negative determination is made in step 620, execution proceeds to step 620d, in which a determination is made whether the class of service C of the data burst under consideration is greater than the class of service $c_f$ of the already-scheduled far-end data burst. If so, execution proceeds to step 620e, in which a function Head_Drop-Tail_Preempt (FIG. 12) is called. As a result of step 620e, because as determined in step 620, the near-end already-scheduled data burst is of a higher priority class of service than the data burst under consideration, the near-end overlapping portion of the data burst under consideration is dropped and the near-end already-scheduled data burst remains scheduled in its entirety. In contrast, because as determined in step 620d, the far-end already-scheduled data burst is of a lower priority class of service than the data burst under consideration, the overlapping portion of the far-end already-scheduled data burst is preempted in favor of scheduling the far-end overlapping portion of the data burst under consideration.

If a negative determination is made in step 620d, execution proceeds to step 620f, in which a function Head-Tail_Drop (FIG. 14) is called. As a result of step 620f, because as determined in step 620, the near-end already-scheduled data burst is of a higher priority class of service than the data burst under consideration, the near-end overlapping portion of the data burst under consideration is dropped and the near-end already-scheduled data burst remains scheduled in its entirety. Similarly, because as determined in step 620d, the far-end already-scheduled data burst is of a higher priority class of service than the data burst under consideration, the far-end overlapping portion of the data burst under consideration is dropped and the far-end already-scheduled data burst remains scheduled in its entirety.

If a negative determination is made in step 618, meaning that a full drop or preemption must be performed because the overlap exceeds the threshold H, execution proceeds to step 624, in which a determination is made whether the class of service C of the data burst under consideration is greater than the class of service $c_n$ of the already-scheduled near-end data burst. If so, execution proceeds to step 624a, in which a function Full_Preempt (FIG. 15) is called. As a result of step 624a, the already-scheduled data burst is preempted in its entirety and the data burst under consideration is scheduled in its entirety. If a negative determination is made in step 624, execution proceeds to step 624b, in which a function Full_Drop (FIG. 16) is called. As a result of step 624b, the data burst under consideration is dropped in its entirety and the already-scheduled data burst remains scheduled in its entirety.

Figure 7:
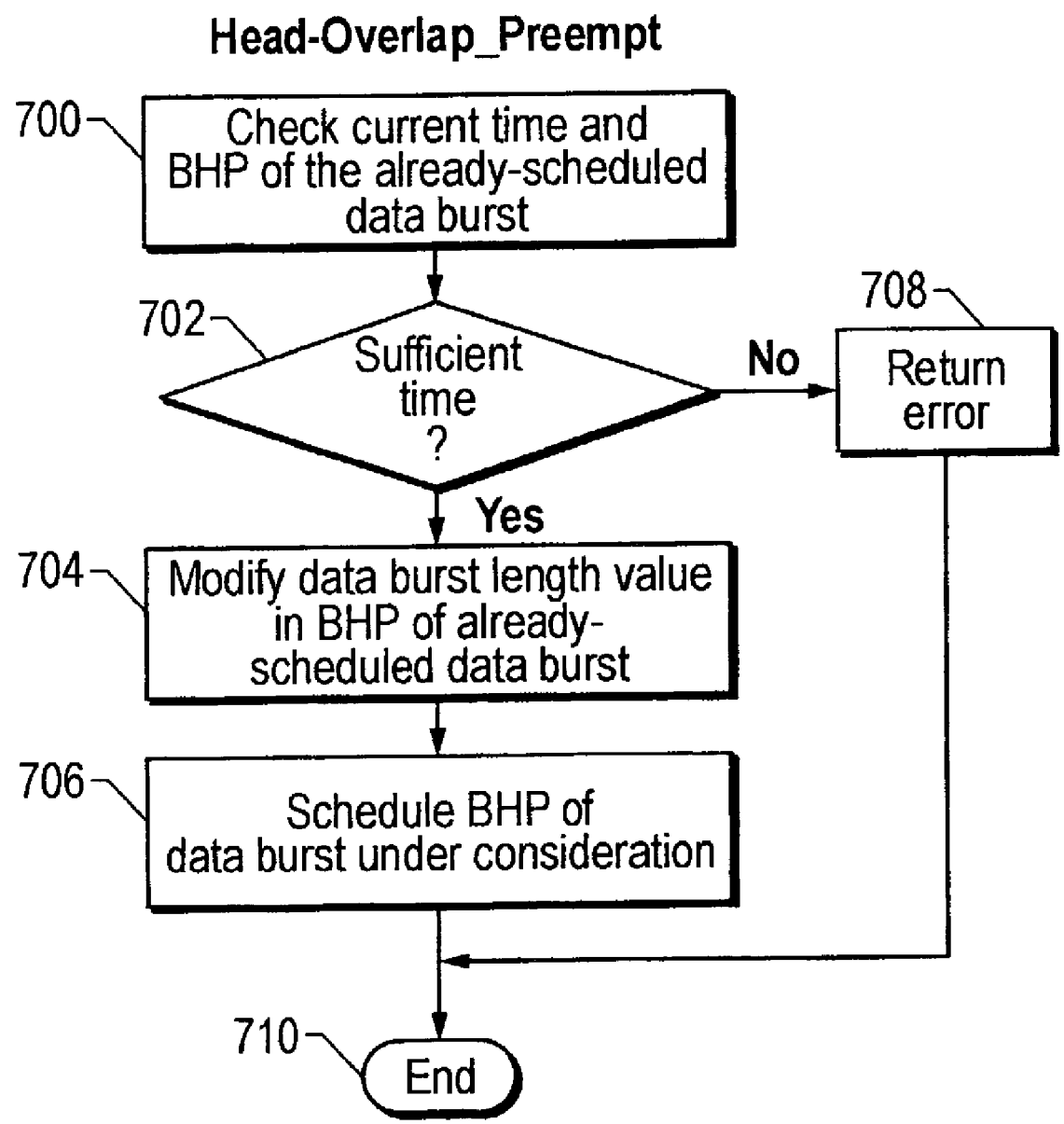
FIG. 7 illustrates operation of a Head-Overlap_Preempt function of the model of FIGS. 6A and 6B.

FIG. 7 illustrates operation of the function Head-Overlap_Preempt (step 614b, FIG. 6A). In step 700, the current time and the BHP of the already-scheduled data burst are checked. In step 702, a determination is made whether there is sufficient time to modify the BHP of the already-scheduled data burst before transmission thereof to the control channel. If so, execution proceeds to step 704, in which the data burst length value in the BHP of the already-scheduled data burst is modified. It will be noted that only this value needs to be modified, as only the length of the already-scheduled data burst is being changed. In step 706, the BHP of the data burst under consideration data burst is scheduled. If a negative determination is made in step 702, execution proceeds to step 708, in which an error message is returned. Execution terminates in step 710. As previously indicated, application of the Head-Overlap_Preempt function results in the overlapping portion of the already-scheduled data burst being preempted in favor of the overlapping portion of the data burst under consideration.

Figure 8:
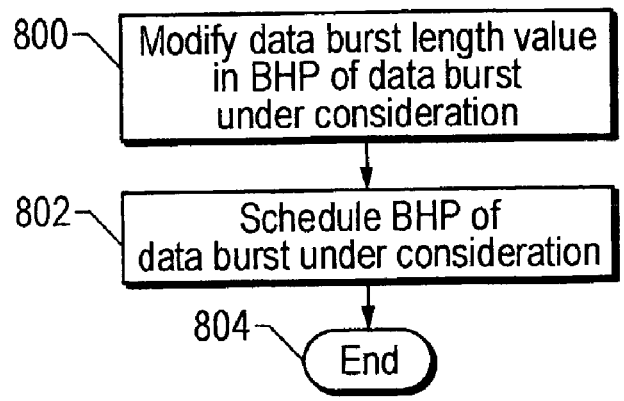
FIG. 8 illustrates operation of a Head-Overlap_Drop function of the model of FIGS. 6A and 6B.

FIG. 8 illustrates operation of the function Head-Overlap_Drop (step 614c, FIG. 6A). In step 800, the data burst length value in the BHP of the data burst under consideration is modified. In step 802, the BHP of the data burst under consideration is scheduled. Execution terminates in step 804.

As previously indicated, application of the Head-Overlap_Drop function results in the overlapping portion of the data burst under consideration being dropped in favor of the overlapping portion of the already-scheduled data burst.

Figure 9:
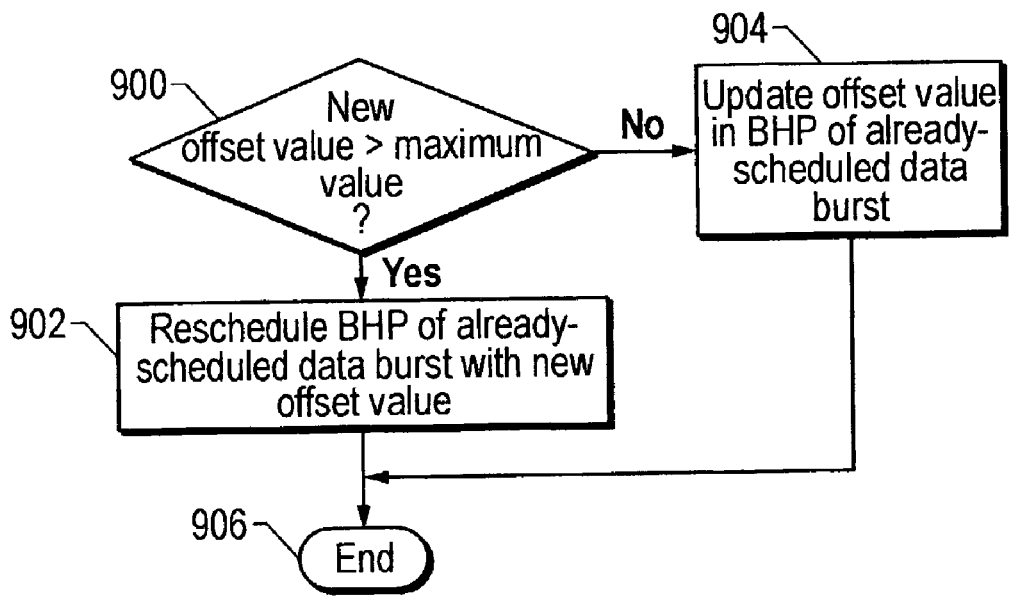
FIG. 9 illustrates operation of a function Tail-Overlap_Preempt function of the model of FIGS. 6A and 6B.

FIG. 9 illustrates operation of the function Tail-Overlap_Preempt (step 616b, FIG. 6A). Since the already-scheduled data burst and its BHP are scheduled after the data burst under consideration, there is no need to check the time; however, the offset time between the already-scheduled data burst and the BHP thereof does change. In step 900, a determination is made whether the new offset value between the already-scheduled data burst and its BHP exceeds a maximum value. If so, execution proceeds to step 902, in which the BHP of the already-scheduled data burst is rescheduled with the new offset value; otherwise, execution proceeds to step 904, in which the offset value in the BHP of the already-scheduled data burst is updated. Execution terminates in step 906.

As previously indicated, application of the Tail-Overlap_Preempt function results in the overlapping portion of the already-scheduled data burst being preempted in favor of the overlapping portion of the data burst under consideration.

Figure 10:
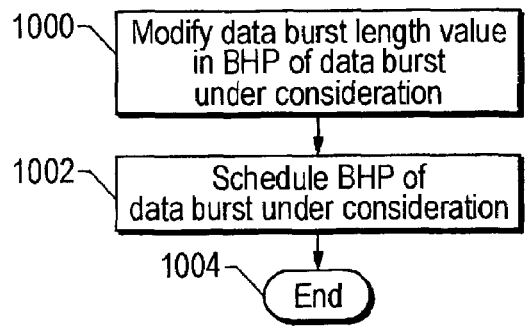
FIG. 10 illustrates operation of a Tail-Overlap_Drop function of the model of FIGS. 6A and 6B.

FIG. 10 illustrates operation of the function Tail-Overlap_Drop (step 616c, FIG. 6A). In step 1000, the data burst length value in the BHP of the data burst under consideration is modified. In step 1002, the BHP of the data burst under consideration is scheduled. Execution terminates in step 1004.

As previously indicated, application of the Tail-Overlap_Drop function results in the overlapping portion of the data burst under consideration being dropped in favor of the overlapping portion of the already-scheduled data burst.

Figure 11:
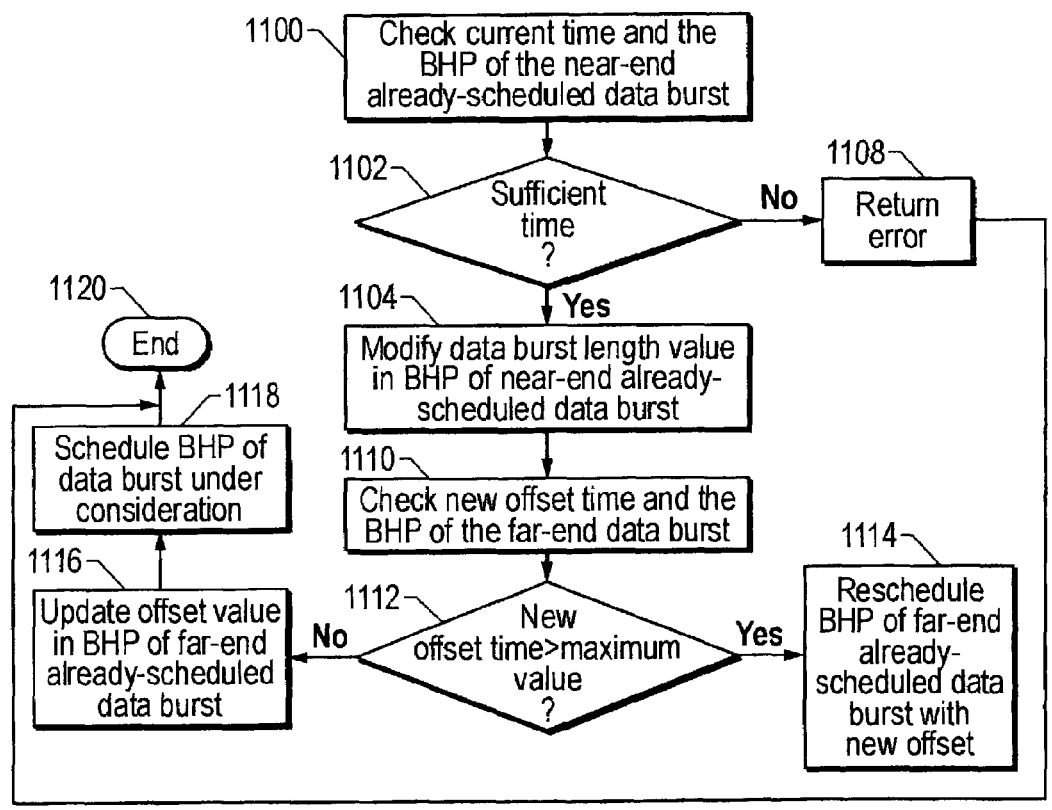
FIG. 11 illustrates operation of a Head-Tail_Preempt function of the model of FIGS. 6A and 6B.

FIG. 11 illustrates operation of the function Head-Tail_Preempt (step 620b, FIG. 6B). In step 1100, the current time and the BHP of the near-end already-scheduled data burst are checked. In step 1102, a determination is made whether there is sufficient time to modify the BHP of the near-end already-scheduled data burst before transmission thereof to the control channel. If a negative determination is made in step 1102, execution proceeds to step 1108, in which an error message is returned; otherwise, execution proceeds to step 1104, in which the data burst length value in the BHP of the near-end already-scheduled data burst is modified. It will be noted that only this value needs to be modified, as only the length of the preempted data burst is being changed.

In step 1110, the new offset time between the far-end already-scheduled data burst and its BHP is checked. In step 1112, a determination is made whether the new offset value exceeds a maximum value. If so, execution proceeds to step 1114, in which the BHP of the far-end already-scheduled data burst is rescheduled with the new offset value; otherwise, execution proceeds to step 1116. In step 1116, the offset value in the BHP of the far-end already-scheduled data burst is updated. In step 1118, the BHP of the data burst under consideration is scheduled. Execution terminates in step 1120.

As previously described, application of the Head-Tail_Drop function results in the overlapping portion of the already-scheduled data burst being preempted in favor of the overlapping portion of the data burst under consideration and the overlapping portion of the already-scheduled data burst being preempted in favor of the overlapping portion of the data burst under consideration.

Figure 12:
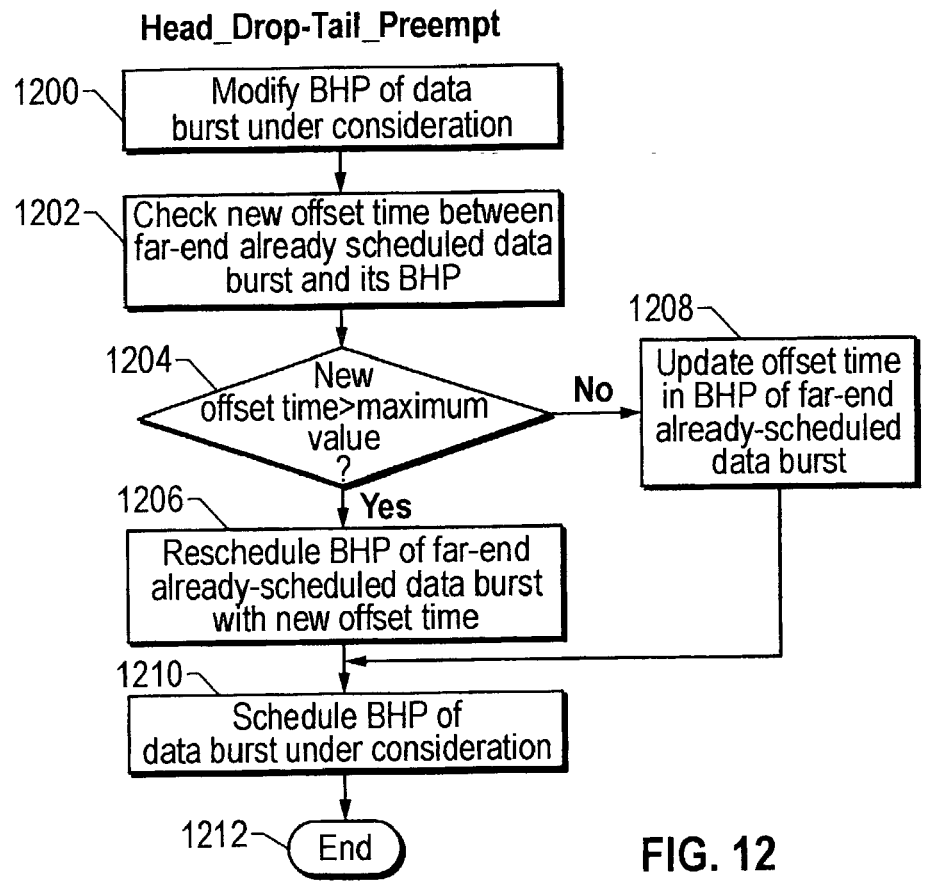
FIG. 12 illustrates operation of a Head_Drop-Tail_Preempt function of the model of FIGS. 6A and 6B.

FIG. 12 illustrates operation of the function Head_Drop-Tail_Preempt(step 620e, FIG. 6B). In step 1200, the length value in the BHP of the data burst under consideration is modified. In step 1202, the new offset time between the far-end already-scheduled data burst and its BHP is checked. In step 1204, a determination is made whether the new offset time exceeds a maximum value. If so, execution proceeds to step 1206, in which the BHP of the far-end already-scheduled data burst is rescheduled with the new offset time; otherwise, execution proceeds to step 1208. In step 1208, the offset time in the BHP of the far-end already-scheduled data burst is updated. In step 1210, the BHP of the data burst under consideration is scheduled. Execution terminates in step 1212.

As previously described, application of the Head_Drop-Tail_Preempt function results in the overlapping portion of the data burst under consideration being dropped in favor of the overlapping portion of the already-scheduled data burst and the overlapping portion of the already-scheduled data burst being preempted in favor of the overlapping portion of the data burst under consideration.

Figure 13:
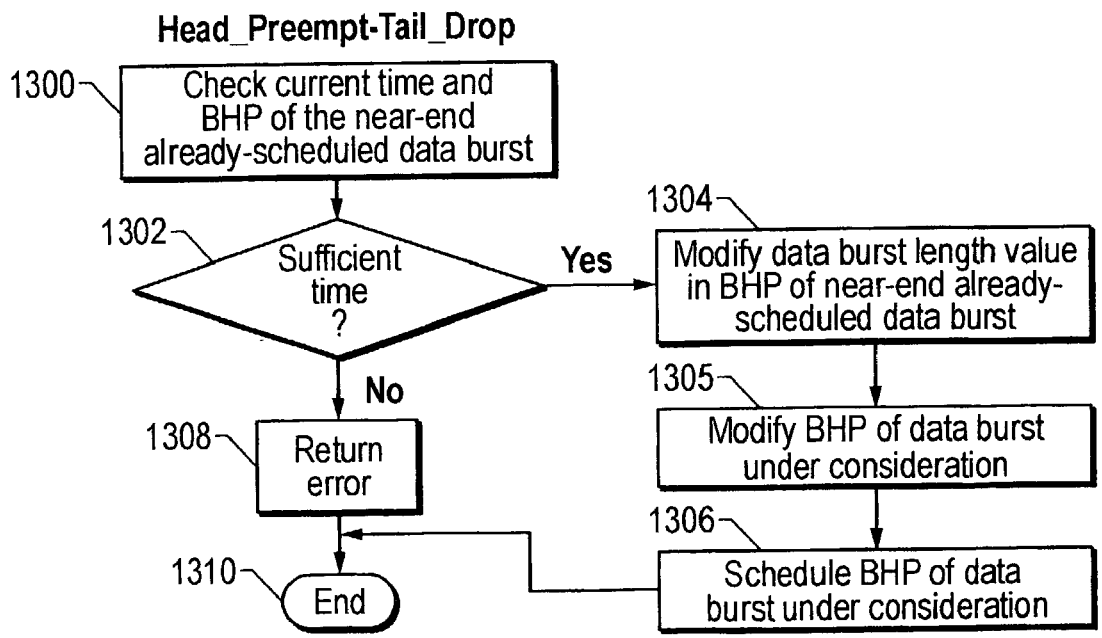
FIG. 13 illustrates operation of a Head_Preempt-Tail_Drop function of the model of FIGS. 6A and 6B.

FIG. 13 illustrates operation of the function Head_Preempt-Tail_Drop (step 620c, FIG. 6B). In step 1300, the current time and the BHP of the near-end already-scheduled data burst are checked. In step 1302, a determination is made whether there is sufficient time to modify the BHP of the near-end already-scheduled data burst before transmission thereof to the control channel. If so, execution proceeds to step 1304, in which the data burst length value in the BHP of the near-end already-scheduled data burst is modified. It will be noted that only this value needs to be modified, as only the length of the preempted data burst is being changed. In step 1305, the BHP of the data burst under consideration is modified. In step 1306, the BHP of the data burst under consideration is scheduled. If a negative determination is made in step 1302, execution proceeds to step 1308, in which an error message is returned. Execution terminates in step 1310.

As previously indicated, application of the Head_Preempt-Tail_Drop function results in the overlapping portion of the already-scheduled data burst being preempted in favor of the overlapping portion of the data burst under consideration and the overlapping portion of the data burst under consideration being dropped in favor of the overlapping portion of the already-scheduled data burst.

Figure 14:
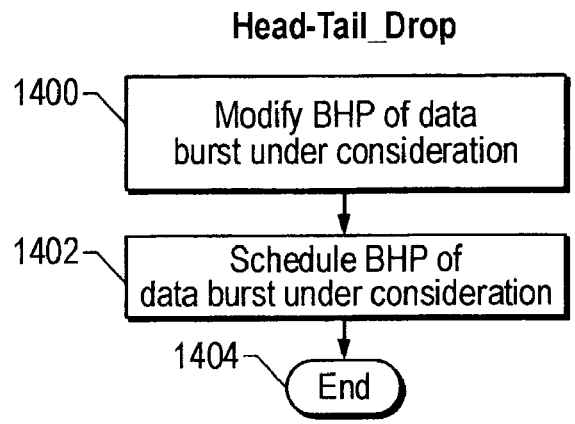
FIG. 14 illustrates operation of a Head-Tail_Drop function of the model of FIGS. 6A and 6B.

FIG. 14 illustrates operation of the function Head-Tail_Drop (step 620f, FIG. 6B). In step 1400, the length value in the BHP of the data burst under consideration is modified. In step 1402, BHP of the data burst under consideration is scheduled. Execution terminates in step 1404.

As previously described, application of the Head-Tail_Drop function results in the overlapping portion of the data burst under consideration being dropped in favor of the overlapping portion of the already-scheduled data burst and the overlapping portion of the data burst under consideration being dropped in favor of the overlapping portion of the already-scheduled data burst.

Figure 15:
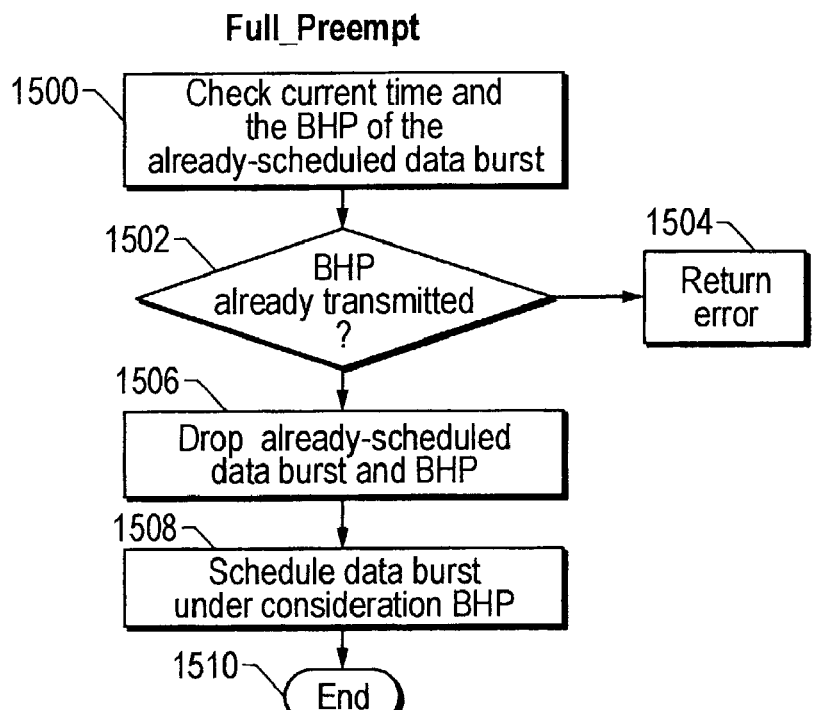
FIG. 15 illustrates operation of a Full_Preempt function of the model of FIGS. 6A and 6B.

FIG. 15 illustrates operation of the function Full_Preempt (step 624a, FIG. 6B). In step 1500, the current time and the BHP of the already-scheduled data burst are checked. In step 1502, a determination is made whether the BHP of the already-scheduled data burst has already been transmitted. If so, an error message is returned in step 1504; otherwise, execution proceeds to step 1506. In step 1506, the already-scheduled data burst and its BHP are dropped. In step 1508, the data burst under consideration and its BHP are scheduled. Execution terminates in step 1510.

As previously indicated, application of the Full_Preempt function results in the entire already-scheduled data burst being preempted in favor of the data burst under consideration.

Figure 16:
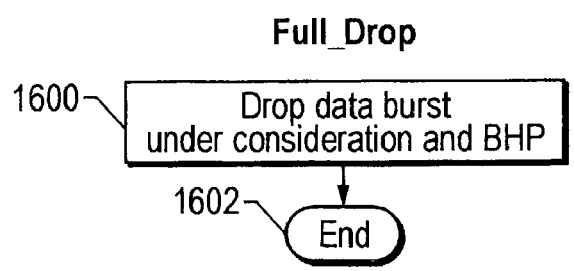
FIG. 16 illustrates operation of a Full_Drop function of the model of FIGS. 6A and 6B.

FIG. 16 illustrates operation of the function Full_Drop (step 624b, FIG. 6B). In step 1600, the data burst under consideration and its BHP are dropped. Execution terminates in step 1602.

As previously indicated, application of the Full_Drop function results in the entire data burst under consideration being dropped in favor of the already-scheduled data burst.

The following section comprises a presentation and comparison of simulation results of one embodiment of the partially preemptive QoS scheduling model as described herein ("Classful with Partial Preemption"), a QoS scheduling model that does not employ the partially preemptive features described herein ("Classful without Partial Preemption"), and a classless model with a void filling scheduler ("Classless"). The simulations are performed for the output link of an OBS core node. It will be assumed that there is no buffering, but that there is full wavelength conversion capability for OBS core nodes. Four classes, designated C0, C1, C2, and C3, where C0 has the highest priority and C3 has the lowest priority, are presumed. All four classes have the same arrival rate.

Figure 17:
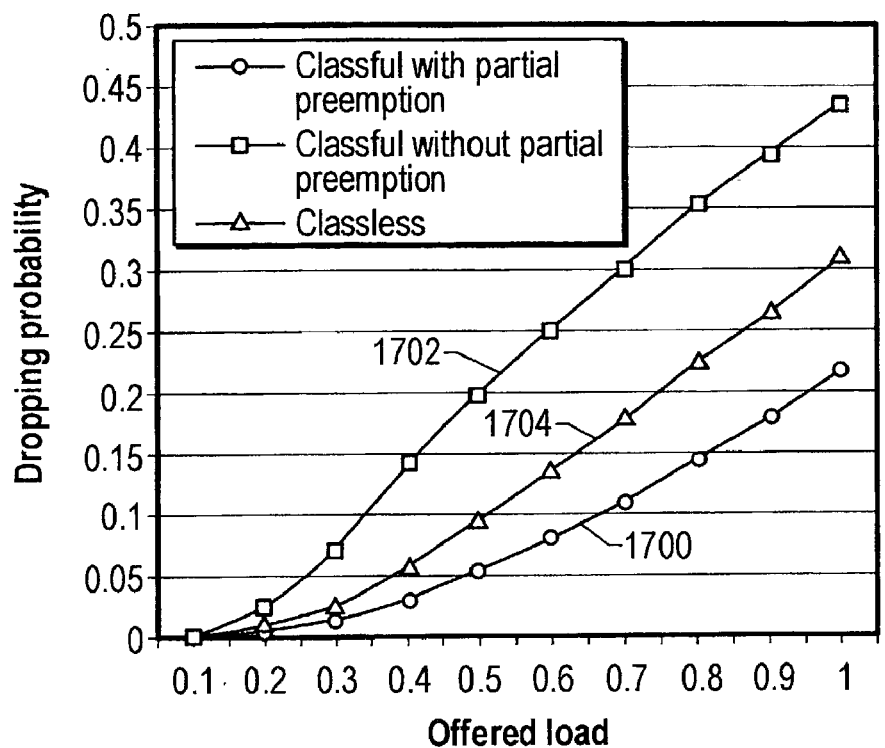
FIGS. 17 and 18 illustrate results of simulations performed in connection with the partially preemptive QoS scheduling model of FIGS. 6A and 6B as compared to other scheduling models.

FIG. 17 illustrates the dropping probability versus offered load for the three models set forth above. As clearly illustrated in FIG. 17, the Classful with Partial Preemption model, represented by a line 1700, has the least, and therefore, the best, total dropping probability figures. The Classful without Partial Preemption model, represented by a line 1702, has a 55% higher dropping probability at an offered load of 0.8, or 80%, than the Classless model, represented by a line 1704, which incurs a large tax for QoS considerations. The Classful with Partial Preemption model decreases the dropping probability in half at an offered load of 0.8.

Because of the variance in burst length and the partial scheduling effect, it can be estimated that the dropping probability in terms of length, not numbers in bursts, to be more meaningful. The leftovers from the IP packet at either end of the segmented burst are minimal.

Figure 18:
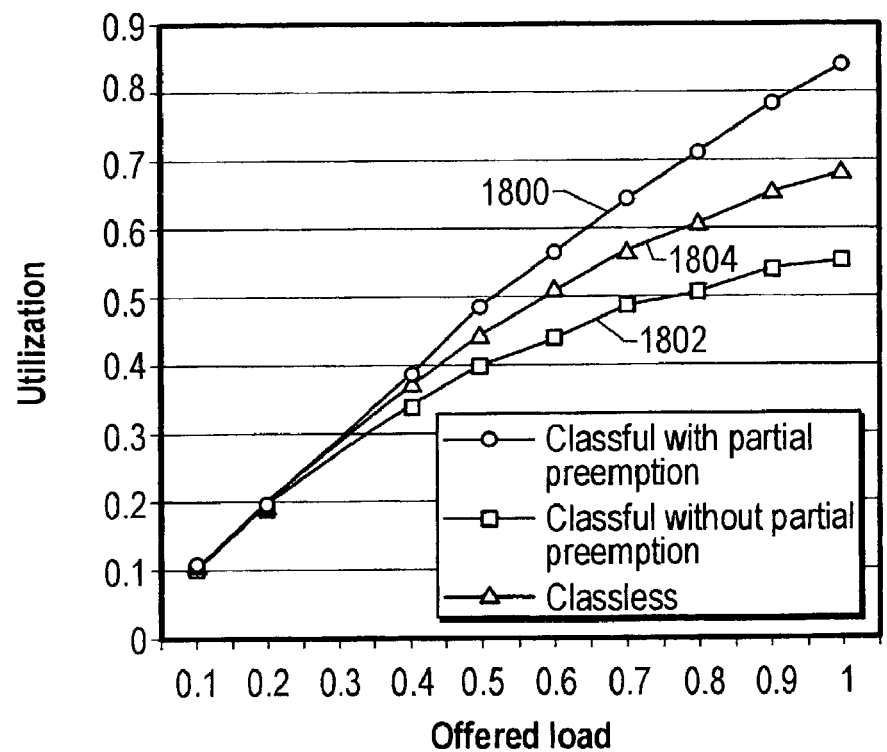

When utilization is looked at as another metric for comparison, as illustrated in FIG. 18, the Classful with Partial Preemption model represented by a line 1800, achieves better utilization than either the Classful without Partial Preemption model, represented by a line 1802, or the Classless model, represented by a line 1804.

In conclusion, as clearly illustrated in FIGS. 17 and 18, the partially preemptive QoS scheduling model described herein delivers proportional service differentiation with the least total dropping probability and higher utilization.

Based upon the foregoing Detailed Description, it should be readily apparent that the present invention advantageously provides an innovative and efficient solution for implementing a partially preemptive QoS scheduling model in an OBS network. In particular, as described above, the embodiments described herein enable a 20% or greater decrease in dropping probability and a 7 to 10% increase in utilization at a given load of 0.8 and beyond according to simulations and increase packet throughput. Additionally, the embodiments described herein are simpler and more practical than optical buffering and wavelength dimensioning and, unlike those techniques, do not have any technological bound. Moreover, application of the embodiments described herein is even easier with the slotted operation that is in more common practice today and the embodiments need not (although they may) be used in combination with optical buffering or wavelength dimensioning techniques.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of scheduling data bursts for transmission on one of a plurality of outgoing channels in a router in an optical burst switched ("OBS") node, the method comprising the steps of:

responsive to a determination that a data burst to be scheduled overlaps with an already-scheduled data burst on each of the plurality of outgoing channels, determining an optimum channel with respect to which the already-scheduled data burst thereon overlaps the least amount with the data burst to be scheduled;

dropping a portion of the data burst to be scheduled that overlaps with the already-scheduled data burst on the optimum channel; and scheduling a remaining portion of the data burst to be scheduled on the optimum channel.

2. The method of claim 1 further comprising the step of, if the overlapping portion of the data burst to be scheduled exceeds a predetermined threshold value, dropping the entire data burst to be scheduled.

3. The method of claim 2 wherein the threshold value comprises a ratio of the length of the overlapping portion of the data burst to be scheduled to the overall length of the data burst to be scheduled.

4. The method of claim 1 further comprising the steps of:

modifying a length value of a Burst Header Packet ("BHP") of the data burst under consideration; and scheduling transmission of the BHP of the data burst under consideration.

5. A method of scheduling data bursts for transmission on one of a plurality of outgoing channels in a router in an optical burst switched ("OBS") node, the method comprising the steps of:

responsive to a determination that a data burst to be scheduled overlaps with an already-scheduled data burst on each of the plurality of outgoing channels, determining an optimum channel with respect to which the already-scheduled data burst thereon overlaps the least amount with the data burst to be scheduled;

dropping a portion of the already-scheduled data burst on the optimum channel that overlaps with the data burst to be scheduled;

if the overlapping portion of the already-scheduled data burst on the optimum channel exceeds a predetermined threshold value, dropping the entire already-scheduled data burst on the optimum channel; and scheduling the data burst to be scheduled on the optimum channel.

6. The method of claim 5 further comprising the step of modifying a Burst Header Packet ("BHP") of the already-scheduled data burst on the optimum channel prior to transmission thereof.

7. A method of scheduling data bursts for transmission on one of a plurality of outgoing channels in a router in an optical burst switched ("OBS") node, the method comprising the steps of:

responsive to a determination that a data burst to be scheduled overlaps with an already-scheduled data burst on each of the plurality of outgoing channels, determining an optimum channel with respect to which the already-scheduled data burst thereon overlaps the least amount with the data burst to be scheduled;

dropping a portion of the already-scheduled data burst on the optimum channel that overlaps with the data burst to be scheduled;

scheduling the data burst to be scheduled on the optimum channel;

determining whether there is sufficient time to modify a Burst Header Packet ("BHP") of the already-scheduled data burst on the optimum channel prior to transmission thereof;

responsive to a determination that there is sufficient time to modify the BHP, modifying a length value there of;

responsive to a determination that there is not sufficient time to modify the BHP, generating an error message.

8. A method of scheduling data bursts for transmission on one of a plurality of outgoing channels in a router in an optical burst switched ("OBS") node, the method comprising the steps of:

responsive to a determination that a data burst to be scheduled overlaps with an already-scheduled data burst on each of the plurality of outgoing channels, determining an optimum one of the outgoing channels with respect to which the already-scheduled data burst thereon overlaps the least amount with the data burst to be scheduled;

responsive to a priority of the already-scheduled data burst on the optimum channel being higher than that of the data burst to be scheduled:

dropping a portion of the data burst to be scheduled that overlaps with the already-scheduled data burst on the optimum channel; and scheduling a remaining portion of the data burst to be scheduled on the optimum channel; and responsive to a priority of the data burst to be scheduled being higher than that of the already-scheduled data burst on the optimum channel:

preempting a portion of the already-scheduled data burst on the optimum channel that overlaps with the data burst to be scheduled; and scheduling the data burst to be scheduled in its entirety.

9. The method of claim 8 wherein the step of dropping a portion of the data burst to be scheduled that overlaps with the already-scheduled data burst on the optimum channel further comprises the step of, if the overlapping portion of the data burst to be scheduled exceeds a predetermined threshold value, dropping the entire data burst to be scheduled.

10. The method of claim 9 wherein the threshold value comprises a ratio of the length of the overlapping portion of the data burst to be scheduled to the overall length of the data burst to be scheduled.

11. The method of claim 8 wherein the step of preempting a portion of the already-scheduled data burst on the optimum channel that overlaps with the data burst to be scheduled further comprises the step of, if the overlapping portion of the already-scheduled data burst on the optimum channel exceeds a predetermined threshold value, preempting the entire already-scheduled data burst on the optimum channel.

12. The method of claim 11 wherein the threshold value comprises a ratio of the length of the overlapping portion of the already-scheduled data burst on the optimum channel to the overall length of the already-scheduled data burst on the optimum channel.

13. Apparatus for scheduling data bursts for transmission on one of a plurality of outgoing channels in a router in an optical burst switched ("OBS") node, the apparatus comprising:

means responsive to a determination that a data burst to be scheduled overlaps with an already-scheduled data burst on each of the plurality of outgoing channels for determining an optimum channel with respect to which the already-scheduled data burst thereon overlaps the least amount with the data burst to be scheduled;

means for dropping a portion of the data burst to be scheduled that overlaps with the already-scheduled data burst on the optimum channel; and means for scheduling a remaining portion of the data burst to be scheduled on the optimum channel.

14. The apparatus of claim 13 further comprising means responsive to the overlapping portion of the data burst to be scheduled exceeding a predetermined threshold value for dropping the entire data burst to be scheduled.

15. The apparatus of claim 14 wherein the threshold value comprises a ratio of the length of the overlapping portion of the data burst to be scheduled to the overall length of the data burst to be scheduled.

16. The apparatus of claim 13 further comprising:

means for modifying a length value of a Burst Header Packet ("BHP") of the data burst under consideration; and means for scheduling transmission of the BHP of the data burst under consideration.

17. Apparatus for scheduling data bursts for transmission on one of a plurality of outgoing channels in a router in an optical burst switched ("OBS") node, the apparatus comprising:

means responsive to a determination that a data burst to be scheduled overlaps with an already-scheduled data burst on each of the plurality of outgoing channels for determining an optimum channel with respect to which the already-scheduled data burst thereon overlaps the least amount with the data burst to be scheduled;

means for dropping a portion of the already-scheduled data burst on the optimum channel that overlaps with the data burst to be scheduled;

means responsive to the overlapping portion of the already-scheduled data burst on the optimum channel exceeding a predetermined threshold value for dropping the entire already-scheduled data burst on the optimum channel; and means for scheduling the data burst to be scheduled on the optimum channel.

18. Apparatus for scheduling data bursts for transmission on one of a plurality of outgoing channels in a router in an optical burst switched ("OBS") node, the apparatus comprising:

means responsive to a determination that a data burst to be scheduled overlaps with an already-scheduled data burst on each of the plurality of outgoing channels for determining an optimum channel with respect to which the already-scheduled data burst thereon overlaps the least amount with the data burst to be scheduled;

means for dropping a portion of the already-scheduled data burst on the optimum channel that overlaps with the data burst to be scheduled;

means for scheduling the data burst to be scheduled on the optimum channel;

means for determining whether there is sufficient time to modify a Burst Header Packet ("BHP") of the already-scheduled data burst on the optimum channel prior to transmission thereof;

means responsive to a determination that there is sufficient time to modify the BHP for modifying a length value thereof;

means responsive to a determination that there is not sufficient time to modify the BHP for generating an error message.

19. The apparatus of claim 17 wherein the threshold value comprises a ratio of the length of the overlapping portion of the data burst to be scheduled to the overall length of the data burst to be scheduled.

* * * * *